(12) United States Patent
Curran

(10) Patent No.: US 10,847,064 B2
(45) Date of Patent: Nov. 24, 2020

(54) HISTORICAL MARKER REPAIR COMPONENTS AND METHODS

(71) Applicant: Savannah Technical College Foundation, Savannah, GA (US)

(72) Inventor: Benjamin R. Curran, Savannah, GA (US)

(73) Assignee: Savannah Technical College Foundation, Savannah, GA (US)

( * ) Notice: Subject to any disclaimer, the term of this patent is extended or adjusted under 35 U.S.C. 154(b) by 51 days.

(21) Appl. No.: 15/915,212

(22) Filed: Mar. 8, 2018

(65) Prior Publication Data

US 2019/0279538 A1    Sep. 12, 2019

(51) Int. Cl.
| | | |
|---|---|---|
| *F16M 13/00* | (2006.01) | |
| *G09F 7/18* | (2006.01) | |
| *B22D 25/02* | (2006.01) | |
| *F16B 23/00* | (2006.01) | |

(52) U.S. Cl.
CPC ............... *G09F 7/18* (2013.01); *B22D 25/02* (2013.01); *F16B 23/0076* (2013.01); *G09F 2007/1813* (2013.01)

(58) Field of Classification Search
CPC ... G09F 7/18; G09F 2007/1813; B22D 25/02; F16B 23/0076; F16M 13/02
USPC .......................... 248/544, 545, 488; 40/607.1
See application file for complete search history.

(56) References Cited

U.S. PATENT DOCUMENTS

| | | | | | |
|---|---|---|---|---|---|
| 641,522 | A | * | 1/1900 | Leger | |
| 1,857,423 | A | * | 5/1932 | Zadek | G09F 7/18 40/607.11 |
| 2,208,344 | A | * | 7/1940 | Reynolds | G09F 7/10 40/611.06 |
| 4,674,213 | A | * | 6/1987 | Keithley | G09F 15/0012 160/371 |
| 5,331,757 | A | * | 7/1994 | Ernest | G09F 15/0012 40/607.1 |
| 5,388,359 | A | * | 2/1995 | DeWitt | G09F 7/18 248/231.71 |
| 5,906,064 | A | * | 5/1999 | Field | G09F 7/08 248/558 |
| 6,062,785 | A | * | 5/2000 | McDermott | F16B 13/061 411/344 |
| 2002/0166275 | A1 | * | 11/2002 | Broadwell | G09F 3/20 40/607.1 |
| 2005/0050783 | A1 | * | 3/2005 | Wichmann | G09F 7/18 40/606.14 |
| 2010/0192434 | A1 | * | 8/2010 | Smith | G09F 7/18 40/606.01 |

\* cited by examiner

*Primary Examiner* — Todd M Epps
(74) *Attorney, Agent, or Firm* — John G. Posa; Belzer PC

(57) ABSTRACT

A repair component for historical markers, and the like, comprises a metal casting including an upper channel dimensioned to receive the lower bottom portion of the original plaque, and a lower collar dimensioned to fit onto the existing post. The plaque may be fastened, welded, glued or otherwise secured within the channel of the repair component. Alternatively, the upper groove of the repair component may include a moveable member forming a jaw that clamps onto the lower edge of the existing plaque. The collar may also be fastened, welded, glued or otherwise secured to the upper end of the pole. Also disclosed is a method of repairing a marker including a plaque with a lower bottom portion that has broken away from a collar fitted to a post.

20 Claims, 5 Drawing Sheets

HISTORICAL MARKER REPAIR COMPONENTS AND METHODS

FIELD OF THE INVENTION

This invention relates generally to historical markers and, in particular, to components and methods for repairing existing markers without having to replace the entire marker.

BACKGROUND OF THE INVENTION

There are thousands of historical markers around the United States, and many more throughout the world. The Georgia Historic Society maintains historic highway markers throughout the State to commemorate historic properties, events and areas of interest. The markers are placed along the highway edge and are constructed as a single cast aluminum sign comprising of a collar 102 (at the bottom) and a plaque 104 with text describing the location's historical significance (FIG. 1). The collar is positioned on a post or pillar 106.

Since markers of this type are manufactured by different companies, and since usage varies from state to state, appearance is not uniform. For example, while most markers include some type of frame 107 around the plaque 104, upper decorations 108, finials, etc. may or may not be present. There are also many different variations in the decorative appearance of the collar 102. The plague 104 typically has raised lettering, and may also include imagery. Such plaques may be large, measuring a few feet on each side, and can therefore be heavy as well.

Unfortunately, the proximity of the markers to the road makes them subject to considerable damage when struck by vehicles. Since the collar and plaque are constructed as a single entity, significant damage to the marker necessitates the re-casting of the entire marker. A significant point of weakness involves the transition between the framed plaque and the lower collar 102. In fact, most markers break between the plaque and the collar (FIG. 2), or the collar itself (FIG. 3), while leaving the upper plaque portion intact.

Currently there is no way to repair these markers, and broken markers must be sent to the same or different manufacturers, which may or may not have the original molds. As such, the marker must be cast again, costing time and money, while losing some of the original character or patina of the broken plaque. Markers of this type are custom designed and made of cast metal, including bronze or aluminum, and are therefore expensive to produce and replace. Recasting a marker and collar as one entity is time consuming with a cost of approximately $2,500 to $3,000 per marker.

Accordingly, any technique or process to repair these markers without complete replacement would save considerable time and expense.

SUMMARY OF THE INVENTION

This invention solves the problem of historic marker replacement by providing a process whereby broken markers may be repaired without having to re-cast the entire marker. In the preferred embodiment, the repair component comprises a metal casting with an upper channel dimensioned to receive the lower edge of the original plaque, and a lower collar dimensioned to fit onto the existing post.

The lower edge of the existing plaque may be fastened, welded, glued or otherwise secured within the upper groove of the repair component. In the preferred embodiment, however, the plaque is fastened to the repair component using specialty anti-theft bolts. Alternatively, the upper channel of the repair component may include a moveable member forming a jaw that clamps onto the lower edge of the existing plaque. The collar, likewise, may also be fastened, welded, glued or otherwise secured to the upper end of the pole.

A method of repairing a marker including a plaque with a lower edge that has broken away from an existing collar fitted to a post comprising the steps of measuring the width of the lower edge of the plaque and the cross section of the post; casting a repair component including an upper channel dimensioned to receive the lower edge of the existing plaque, and a lower collar dimensioned to fit onto the existing post; installing and securing the lower edge of the plaque within the channel of the repair component; and installing and securing the lower collar onto the existing post, which may be of metal or wood of varying cross section. The casting of the repair component may be of any suitable metal or alloy, including bronze or aluminum.

DETAILED DESCRIPTION OF THE PREFERRED EMBODIMENTS

This invention resides in repair components and methods for repairing historical markers and the like without having to replace the entire marker, thereby saving considerable time and expense.

Figure 1:
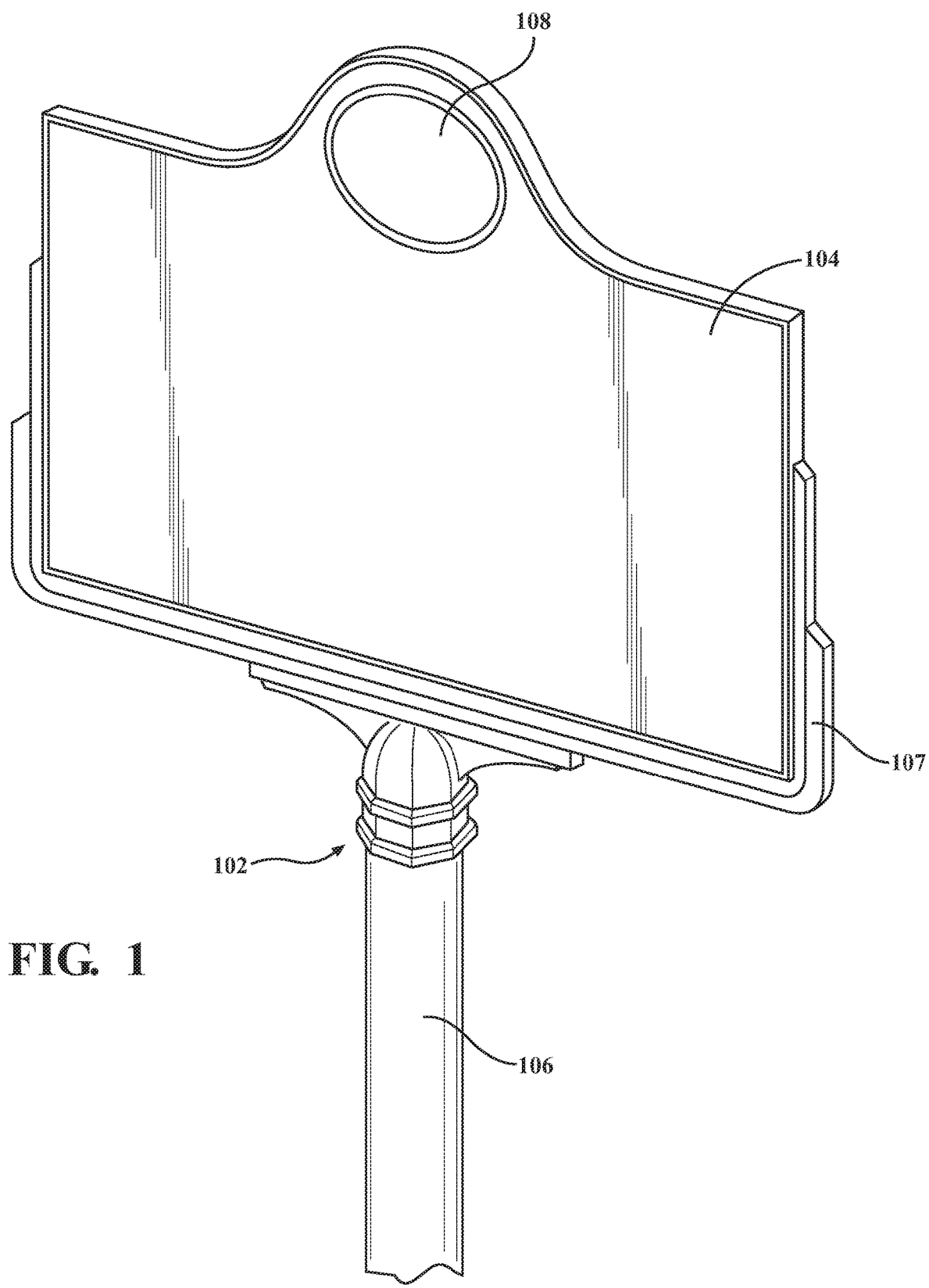
FIG. 1 shows a typical historical marker with the inderstanding that numerous variations exist on this theme.
Figure 2:
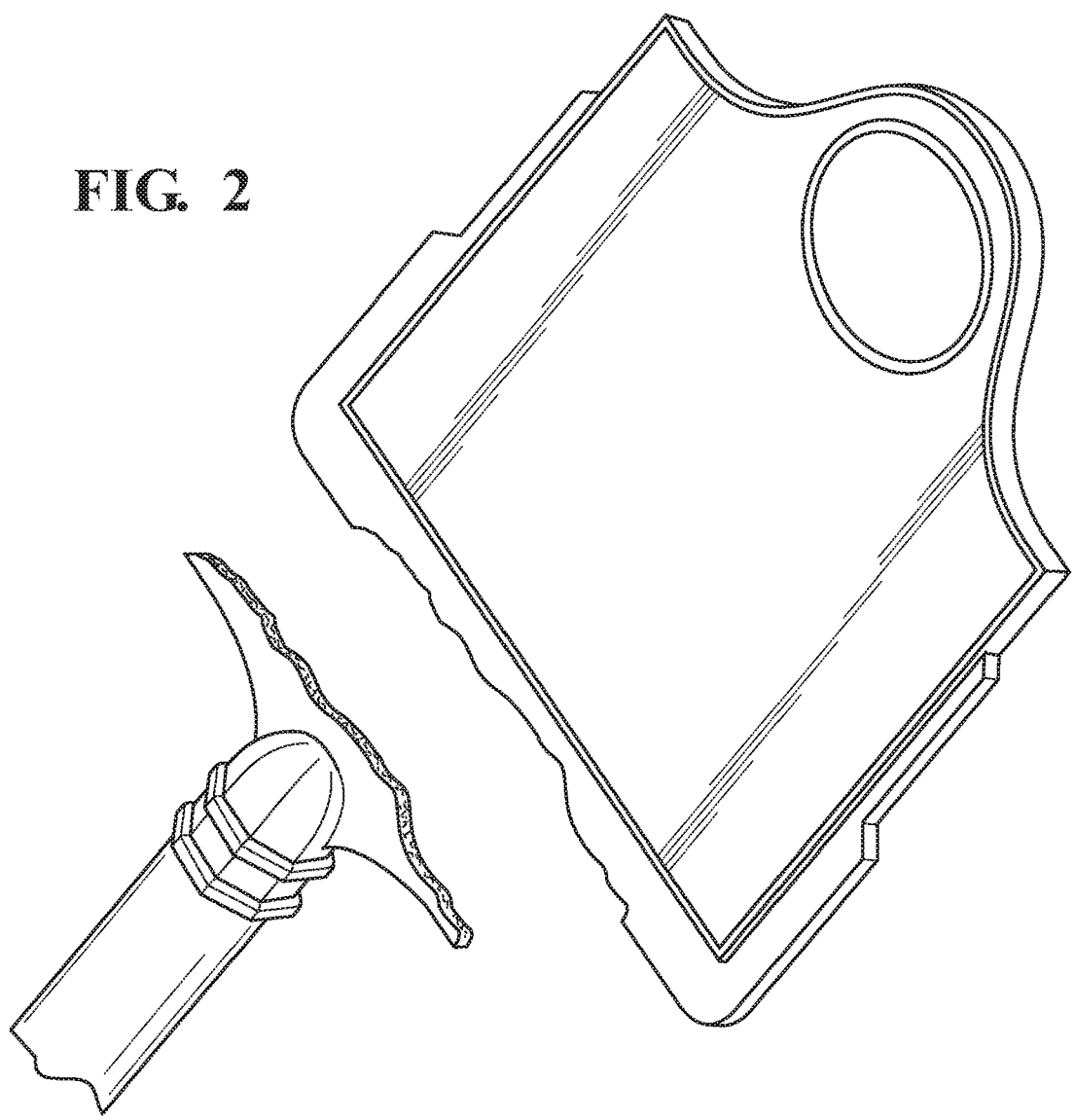
FIG. 2 shows a plaque broken away from its collar.
Figure 3:
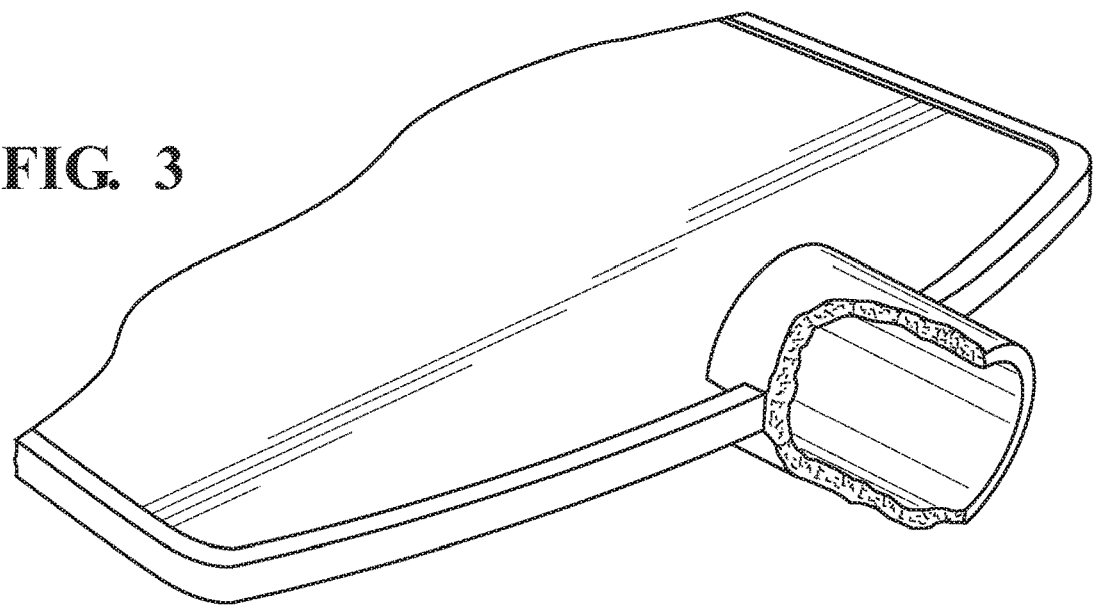
FIG. 3 illustrates a broken collar.
Figure 4:
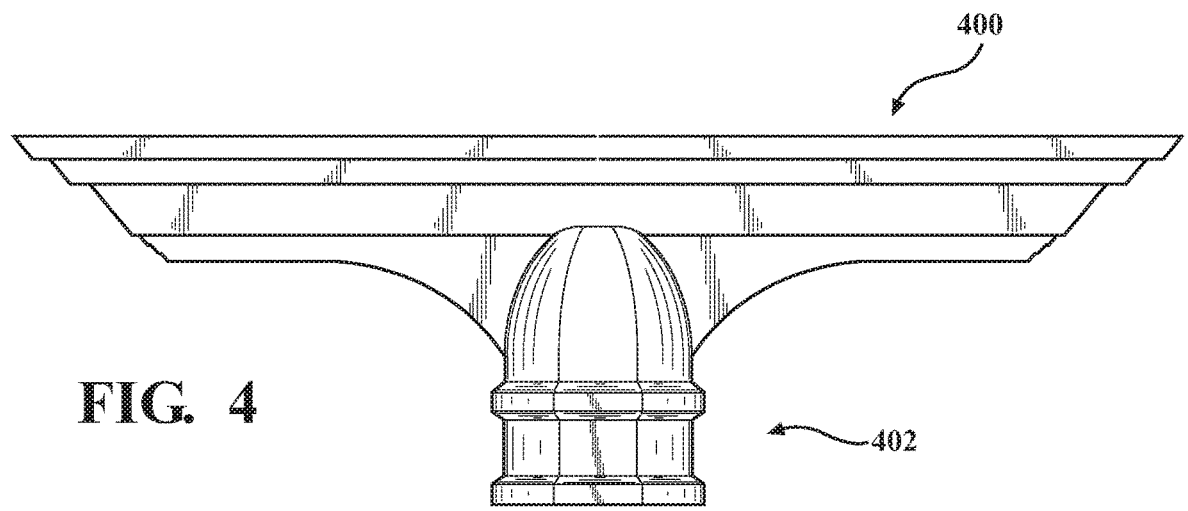
FIG. 4 is side view of a historical marker repair component fabricated in accordance with this invention.
Figure 5:
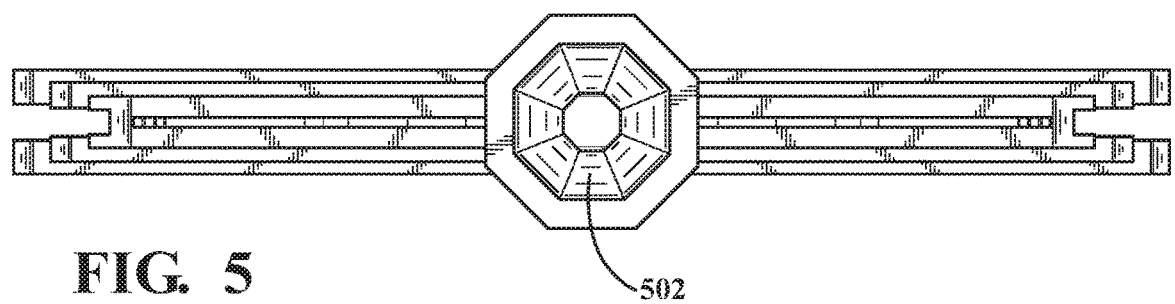
FIG. 5 is a bottom view of the repair component of FIG. 4.
Figure 6:
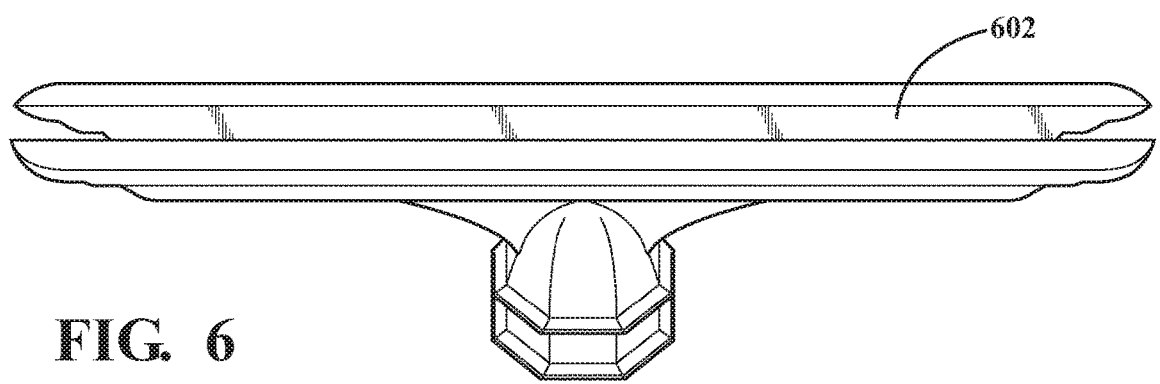
FIG. 6 is a top, oblique view of the repair component of FIG. 4 showing a channel configured to receive the lower portion of an existing plaque.
Figure 7:
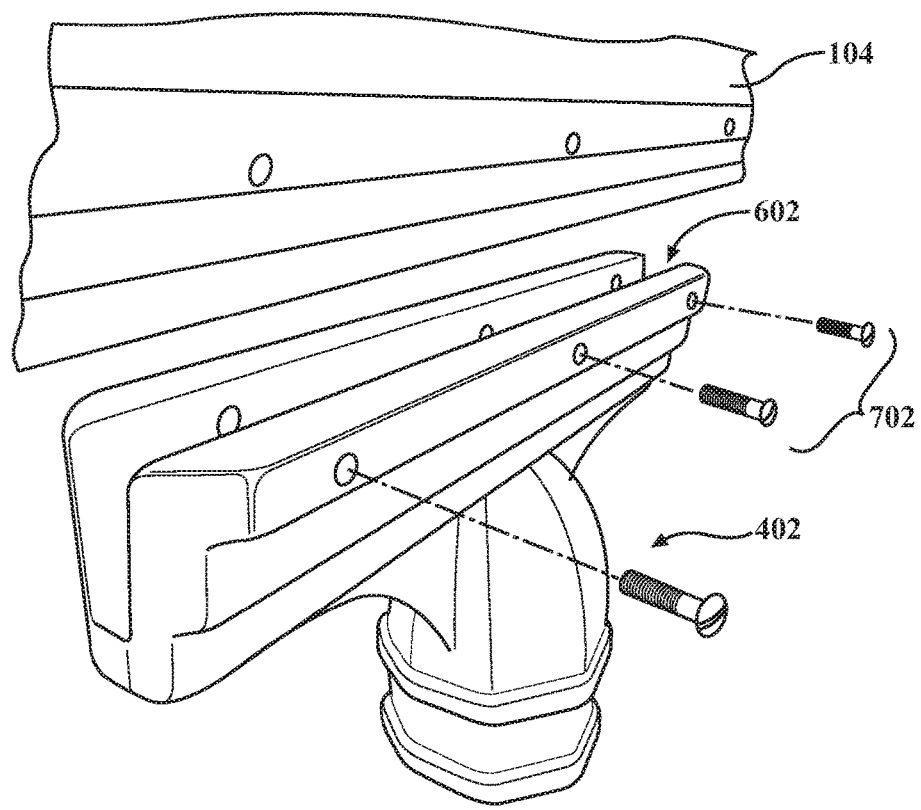
FIG. 7 is an oblique view showing the use of specialty anti-theft bolts.

Having discussed the problem of marker damage in the Background of the Invention in reference to FIG. 1-3, FIG. 4 is side view of a repair component 400 fabricated in accordance with this invention. In the preferred embodiment, the entire component 400 is a metal casting from bronze or aluminum, for example, using a process described in further detail below. FIG. 5 is a bottom view of the repair component showing a socket 502 formed in the lower collar portion 402. FIG. 6 is a top, oblique view of the repair component of FIG. 4, showing a channel 602 configured to receive the lower portion of an existing plaque.

The channel 602 of the repair component has a width in the range of 0.5 to 3 inches, more preferably 0.5 to 1.5 inches, and most preferably 1 inch; and a length in the range of 12 to 36 inches, more preferably 24 to 36 inches, and most preferably 30 inches, which should accommodate the vast majority of markers in need of repair. Further, since the component 400 is cast, different versions, with different groove widths, may be produced and inventoried. The same holds true of the lower coupling 402 and socket 502. Although the socket has a hexagonal cross section as shown, square, round and other profiles may be accommodated as well.

Figure 8:
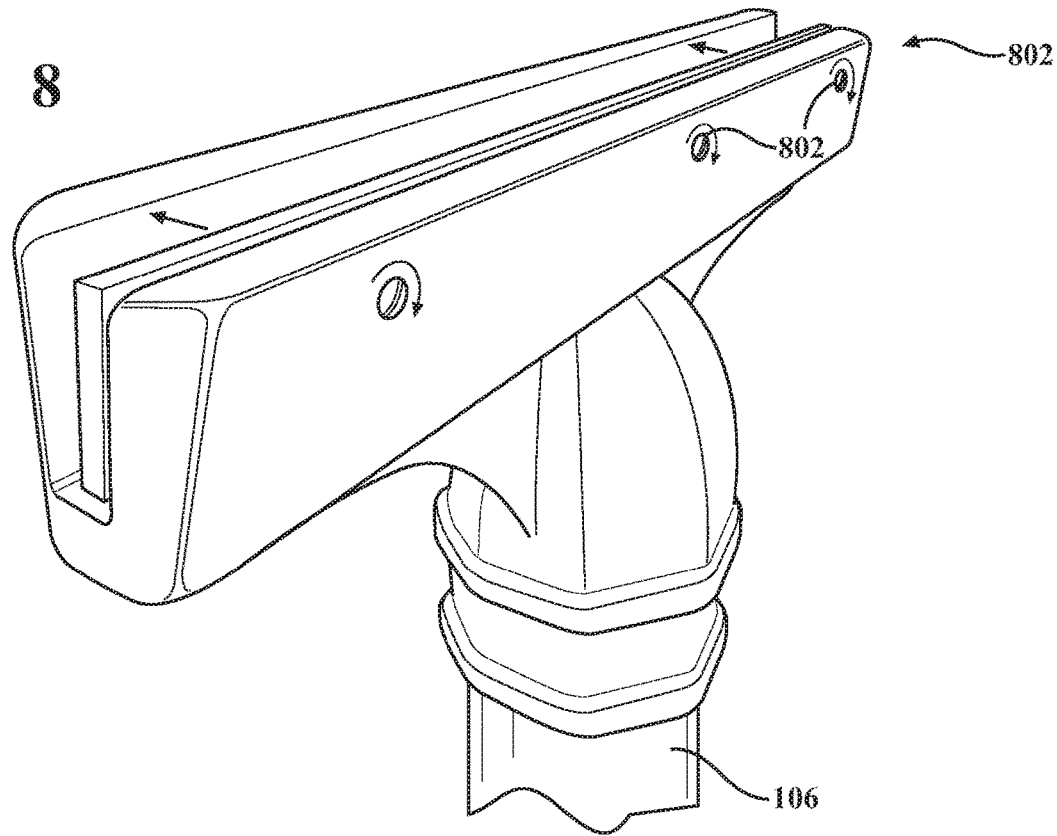
FIG. 8 is a top, oblique view of an alternative embodiment showing a channel with a clamping jaw that receives the lower portion of an existing plaque.

Any appropriate method may be used to retain the original plaque 104 in the channel 602, and any appropriate technique may be used to fasten the collar 402 onto an existing post 106. In the preferred embodiments, however, specialty anti-theft bolts 702 may be used for both purposes, as shown in FIG. 8. Alternatively, if the repair component and the plaque and/or post are of the same metals, welding may be used. As a further alternative, epoxies or other bonding agents are an option. In accordance with an alternative embodiment, the channel may be constructed with one or more moveable members creating a jaw-like structure 802 that clamps onto the lower edge of a plaque with threaded fasteners 804, for example, as shown in FIG. 8.

In terms of the manufacturing process, a cast may be made of the collar portion of a broken marker to retain decorative features, though may not be necessary that the identical collar be used to replace the broken one. The upper portion of the original collar is modified to include a channel having a width to receive the lower portion of the plaque. The casting is "cleaned up" to remove flashing and other artifacts. While the cleaned and polished casting may be used directly for the repair, in some installations the repair component may painted for protection and/or to achieve a desired coloration such as "weathered bronze," or to otherwise match the original plaque.

Figure 9:
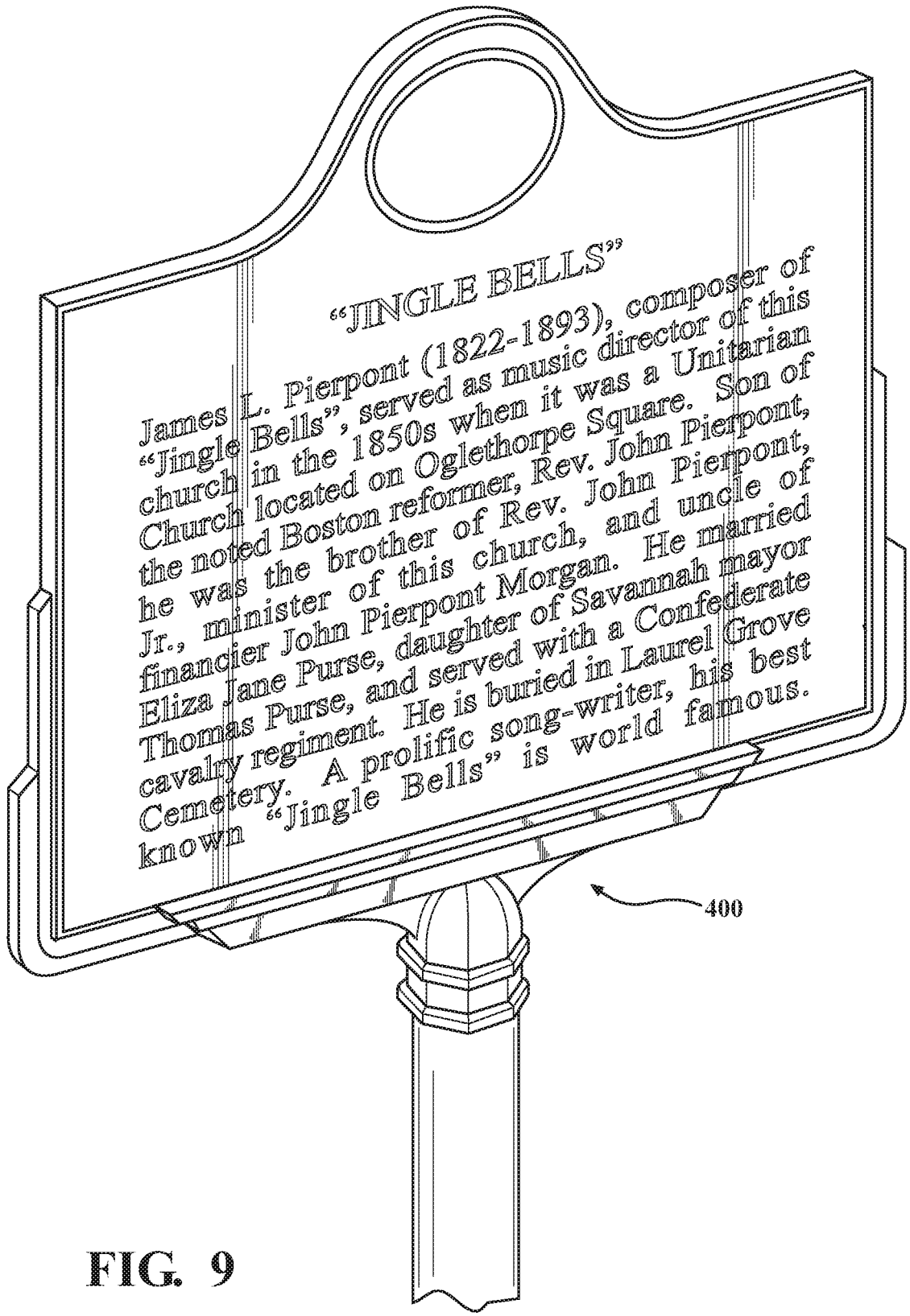
FIG. 9 is depicts a historical marker having been repaired in accordance with this invention.

FIG. 9 shows a historical marker having been repaired in accordance with this invention. In addition to reduced costs, the use of the invention also saves considerable time since in many instances the repair can be made in the field—that is, at the site of the broken marker.

The invention claimed is:

1. A repair component for an existing plaque that has broken off of an existing post, and wherein the existing plaque retains a lower bottom portion, the repair component comprising:
    a unitary metal casting including an upper portion with a channel dimensioned to receive the lower bottom portion of the existing plaque, and a lower collar including a socket having a cross-sectional geometry dimensioned to fit onto the existing post; and
    wherein the upper portion, the lower collar, and socket of the repair component are integrally formed as part of the unitary metal casting.

2. The repair component of claim 1, wherein the lower bottom portion of the existing plaque is fastened, welded, glued or otherwise secured within the upper channel of the repair component.

3. The repair component of claim 2, wherein the lower bottom portion of the existing plaque is secured within the upper channel of the repair component using one or more anti-theft bolts.

4. The repair component of claim 1, wherein the channel of the repair component includes a moveable member forming a jaw that clamps onto the lower bottom portion of the original plaque.

5. The repair component of claim 1, wherein the lower collar of the repair component is fastened, welded, glued or otherwise secured to the upper end of the post.

6. The repair component of claim 5, wherein the lower collar of the repair component is secured to the existing post using one or more anti-theft bolts.

7. The repair component of claim 1, wherein the cross sections of the socket and existing post are square or round.

8. The repair component of claim 1, wherein the cross sections of the socket and existing post are hexagonal.

9. The repair component of claim 1, wherein the unitary metal casting is a bronze casting.

10. The repair component of claim 1, wherein the unitary metal casting is an aluminum casting.

11. The repair component of claim 1, wherein the channel has a width in a range of 0.5 to 1.5 inches.

12. The repair component of claim 1, wherein the channel has a width of about one inch.

13. The repair component of claim 1, wherein the channel has a length in a range of 12 to 36 inches.

14. The repair component of claim 1, wherein the channel has a length in a range of 24 to 36 inches.

15. The repair component of claim 1, wherein the channel has a length of about 30 inches.

16. A method of repairing an informational marker including an existing plaque having a lower bottom portion with a width that has broken away from a lower collar fitted to an existing post having a cross section, the method comprising the steps of:
    measuring the width of the lower bottom portion of the plaque;
    measuring the cross section of the post;
    casting a unitary repair component including an upper portion with a channel dimensioned to receive the lower bottom portion of the plaque, and a lower collar integrally formed with the upper portion, and wherein the lower collar includes a socket having a cross sectional geometry dimensioned to fit onto the existing post;
    installing and securing the lower bottom portion of the plaque within the channel of the repair component; and
    installing and securing the lower collar onto the existing post.

17. The method of claim 16, including the step of casting a bronze or aluminum unitary repair component.

18. The method of claim 16, including the step of providing an elongated member to form a jaw in the channel that clamps onto the lower bottom portion of the original plaque.

19. The method of claim 16, including the step of casting a unitary repair component having a socket with a square or round cross section adapted for installation onto an existing post having a corresponding square or round cross section.

20. The method of claim 16, including the step of casting a unitary repair component having a socket with a hexagonal cross section adapted for installation onto an existing post having a corresponding hexagonal cross section.

* * * * *